United States Patent [19]

Aoki et al.

[11] Patent Number: 5,276,665
[45] Date of Patent: Jan. 4, 1994

[54] MAGNETO-OPTICAL DISK RECORDING AND REPRODUCING APPARATUS CAPABLE OF REPRODUCING A PLURALITY OF DISK TYPES

[75] Inventors: Kazuhiro Aoki, Suita; Akinobu Soneda, Kyoto; Akira Kurahashi, Yawata, all of Japan

[73] Assignee: Matsushita Electric Industrial Co., Ltd., Osaka, Japan

[21] Appl. No.: 920,094

[22] Filed: Jul. 24, 1992

[30] Foreign Application Priority Data

Jul. 27, 1991 [JP] Japan ............... 3-184529

[51] Int. Cl.[5] .............................. G11B 3/90
[52] U.S. Cl. ..................... 369/58; 369/13; 369/54; 369/48; 369/110
[58] Field of Search ............... 369/32, 44.35, 44.41, 369/58, 124, 54, 13, 48, 110; 360/110

[56] References Cited

U.S. PATENT DOCUMENTS

| 4,455,632 | 6/1984 | Braat | 369/44.35 X |
| 4,639,907 | 1/1987 | Aoki et al. | 369/13 X |
| 4,688,203 | 8/1987 | Koishi et al. | 369/48 |
| 4,698,695 | 10/1987 | Kosaka et al. | 369/58 X |
| 4,833,662 | 5/1989 | Yoda | 369/110 X |
| 5,070,494 | 12/1991 | Emoto et al. | 364/13 X |
| 5,105,415 | 4/1992 | Tayefeh | 369/110 |

FOREIGN PATENT DOCUMENTS

| 0184188 | 11/1986 | European Pat. Off. |
| 0381768 | 8/1990 | European Pat. Off. |
| 0420209 | 3/1991 | European Pat. Off. |
| 0469727 | 5/1992 | European Pat. Off. |
| 2591787 | 6/1987 | France |
| 60-234235 | 11/1985 | Japan |
| 234235 | 11/1985 | Japan ................ 369/13 |
| 62-128044 | 6/1987 | Japan |

Primary Examiner—Aristotelis Psitos
Assistant Examiner—Duncan Wilkinson
Attorney, Agent, or Firm—Ratner & Prestia

[57] ABSTRACT

An optical magnetic disk recording/reproducing apparatus is capable of reproducing address data when recording data signals on a magneto-optical disk and when deleting data signals from a magneto-optical disk. The reproduction of address data is performed with a high degree of stability. The apparatus includes an optical head, photoelectric voltage converters, various adders, a differential device and several switches. A first switch switches between a first position in which an output of the first switch is connected to the output of the differential device and a second position in which the output of the first switch is connected to a reference voltage. A second switch includes a first position in which an output of the second switch is connected to the output of one of the adders and a second position in which the output of the second switch is connected to the output of the first switch. Several control signal generators control the switches. Thus, the first switch outputs a signal from a differential amplifier during data reproduction and outputs a reference voltage during data recording and erasing.

2 Claims, 8 Drawing Sheets

MAGNETO-OPTICAL DISK RECORDING AND REPRODUCING APPARATUS CAPABLE OF REPRODUCING A PLURALITY OF DISK TYPES

BACKGROUND OF THE INVENTION

1. Field of the Invention

The present invention relates to an optical magnetic disk recording/reproducing apparatus for high density digital recording, and the playback signal processing circuit thereof.

2. Description of the Prior Art

Optical magnetic disk recording/reproducing devices have been developed and marketed by numerous companies in recent years as high capacity data storage devices with a high data transfer rate. Commonly known as magneto-optical disk drives, read/write magneto-optical drives are still technologically immature in many ways, and particular improvement in the stability of the data reading, writing, and erasing operations is needed.

The present invention therefore relates to an optical magnetic disk recording/reproducing apparatus comprising a reproducing component that reproduces a stable address signal for the data recording and erasing operations.

The conventional optical magnetic disk recording/reproducing apparatus is described below with reference to the accompanying FIGS.

FIG. 1 is a block diagram of the reproducing device in a conventional optical magnetic disk recording/reproducing apparatus. In this device a magneto-optical disk 1 is driven by a spindle motor 2, and data is recorded to and reproduced from the magneto-optical disk 1 by the optical head 3. The optical head 3 in turn comprises a laser, lens, actuator, and polarized beam splitter. The laser power of the optical head 3 is controlled according to the control signal 24 output by the laser drive circuit 4. The magnetic bias 5 is used to modify the magnetic properties of the magneto-optical disk 1. The outputs from the photoelectric voltage conversion circuits 6-9 are added by adding amplifier circuits 10 and 11, the outputs of which are input to adding amplifier circuit 12 and differential amplifier circuit 13. The selector switch circuit 15 is controlled by control signal 18 to choose either the adding amplifier 12 or differential amplifier 13 output. The output from the selector switch circuit 15 is applied to the automatic gain control circuit 19 and digitizing circuit 16, and further to the detection circuit.

The address area, which is output from the adding amplifier 12, and the data area, which is the output from the differential amplifier circuit 13, are selected by the selector switch circuit 15 to generate and output a single signal consisting of both an address and a data area. The signal from the selector switch circuit 15 is applied to the automatic gain control circuit 19 for gain control.

The AGC 19 controls the gain of the output signal from the selector switch circuit 15, as shown in FIG. 2. During data reproducing mode, since the address signal and data signal waveforms have nearly equal amplitude, the output of the AGC 19 does not result in any gain change in the address area and data area. However, during writing or erasing mode, the amplitude of the data signal is amplified by a predetermined amount (FIG. 2 waveform (a)) to increase the laser power incident to the magneto-optical disk 1. Thus, the address signal level deforms during these modes in response to the change in the data signal. Furthermore, signal saturation in the data area also occurs. To remove such a drawback the automatic gain control circuit 19 is provided so that the data area gain is reduced as shown in FIG. 2 waveform (b). The output signal is then converted to a digital signal by the digitizing circuit 16, and then output to the detection circuit.

The problem with this construction, therefore, is that need for an automatic gain control circuit 19 to enable stable reproduction of the address area and data area during data recording, erasing, and reproduction results in an unavoidable increase in device size.

In addition, since the response of the automatic gain control 19 is very slow, it is difficult to enable stable detection of the address area, such as the sector mark, during data recording and erasing because of the residual level changes in the address area.

SUMMARY OF THE INVENTION

Therefore, an object of the present invention is to provide an optical magnetic disk recording/reproducing apparatus featuring a simplified circuit design, and enabling stable detection of the address area during data recording and erasing.

To achieve this object, an optical magnetic disk recording/reproducing apparatus according to the present invention comprises a head means for emitting a beam to a disk and for receiving a reflected beam from the disk; first, second, third and fourth photoelectric voltage conversion means for converting reflected beam to electric signal; a first adding means for adding the outputs from the first and second photoelectric voltage conversion means; a second adding means for adding the outputs from the third and fourth photoelectric voltage conversion means; a third adding means for adding the outputs of the first and second adding means; a differential operating means for outputting a difference between the first and second adding means; a first switching means for switching between a first position in which an output of the first switching means is connected to the output of the differential operating means and a second position in which the output of the first switching means is connected to a reference voltage; a second switching means for switching between a first position in which an output of the second switching means is connected to the output of the third adding means and a second position in which an output of the second switching means is connected to the output of the first switching means; a first control signal generating means for generating a first control signal which takes a first level during an address signal period and a second level during a data signal period, said first control signal being used for turning said second switching means to the first and second positions in response to said first and second levels thereof, respectively; and a second control signal generating means for generating a second control signal which takes a first level during a recording or erasing mode of operation and a second level during a reproducing mode of operation, said second control signal used for turning said first switching means to the first and second positions in response to said second and first levels thereof, respectively.

The use of a first switch means that outputs the differential amplifier output during data reproduction, and outputs the reference voltage during data recording and erasing makes an automatic gain control circuit unnecessary and address area detection more stable.

By additionally providing a constant gain means for setting the second adding means output to a predetermined gain level, and a third switching means for selecting between the output of the constant gain means and the output of the second switching means, which selects the address area or the data area, signals can also be reproduced from disks with different reflectivity characteristics or recorded with different data reproduction formats.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DESCRIPTION OF THE PREFERRED EMBODIMENTS

Figure 1:
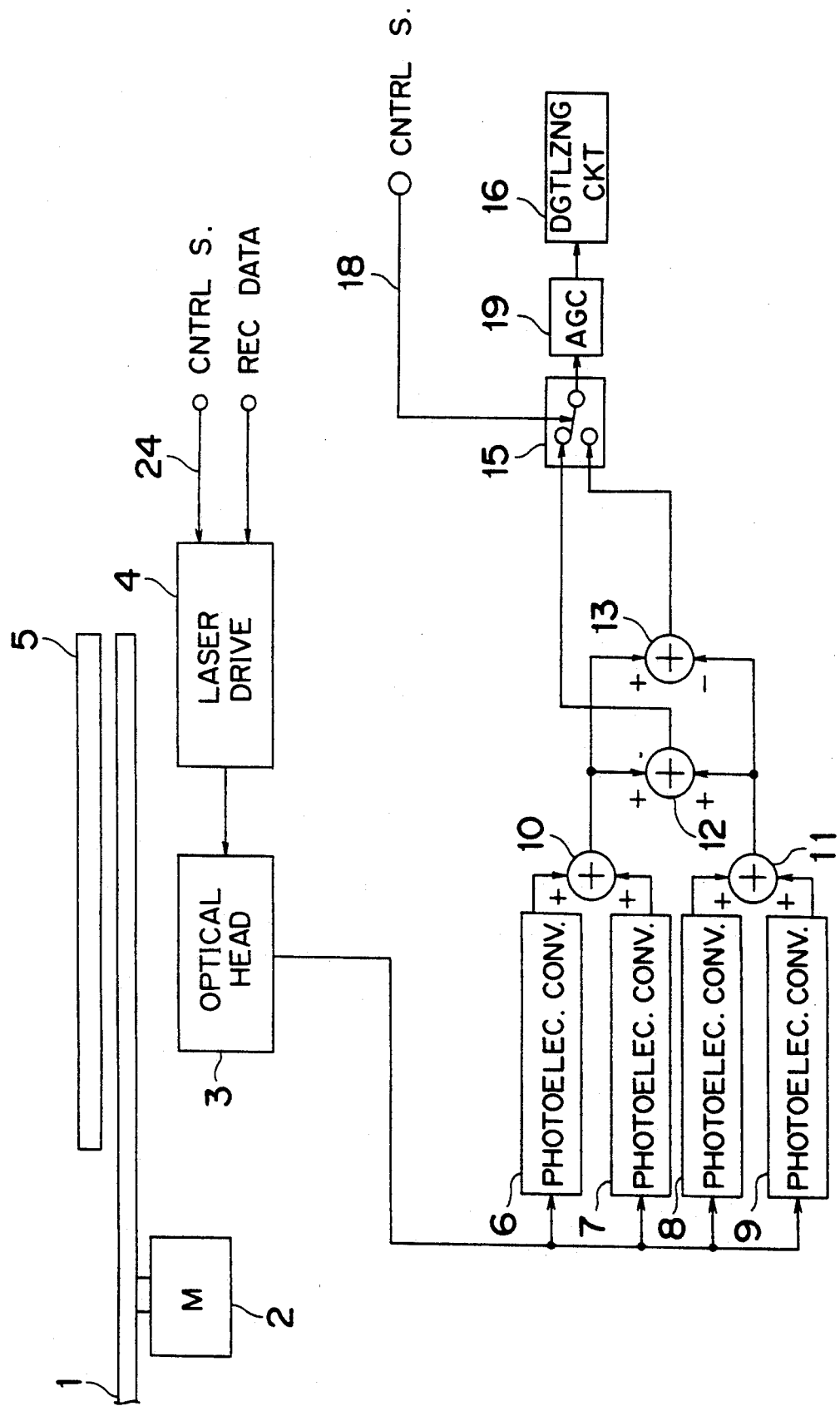
FIG. 1 shows a block diagram of a prior art optical magnetic disk recording/reproducing apparatus.
Figure 2:
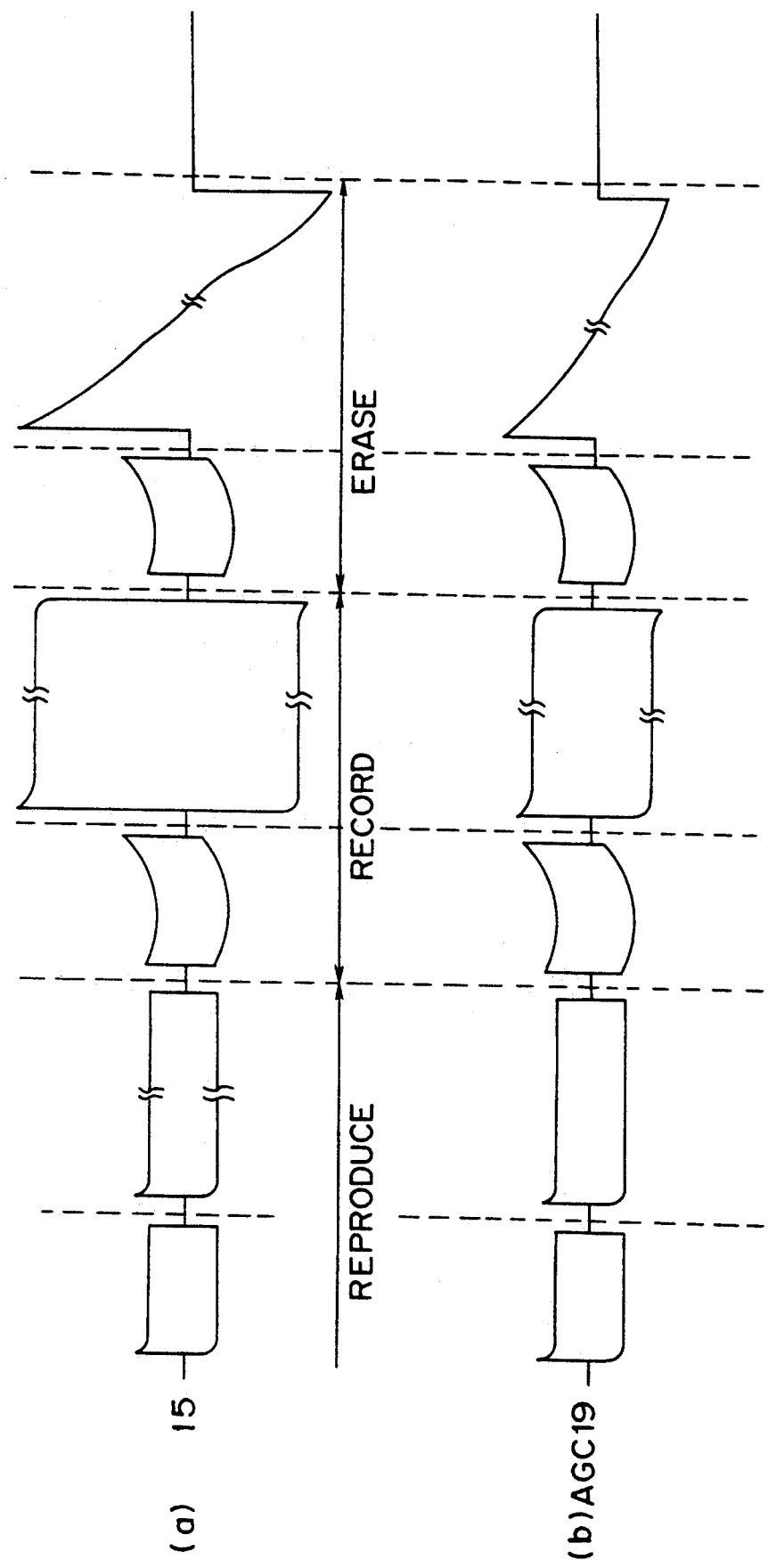
FIG. 2 shows waveforms before and after the automatic gain control circuit in the prior art optical magnetic disk recording/reproducing apparatus.
Figure 3:
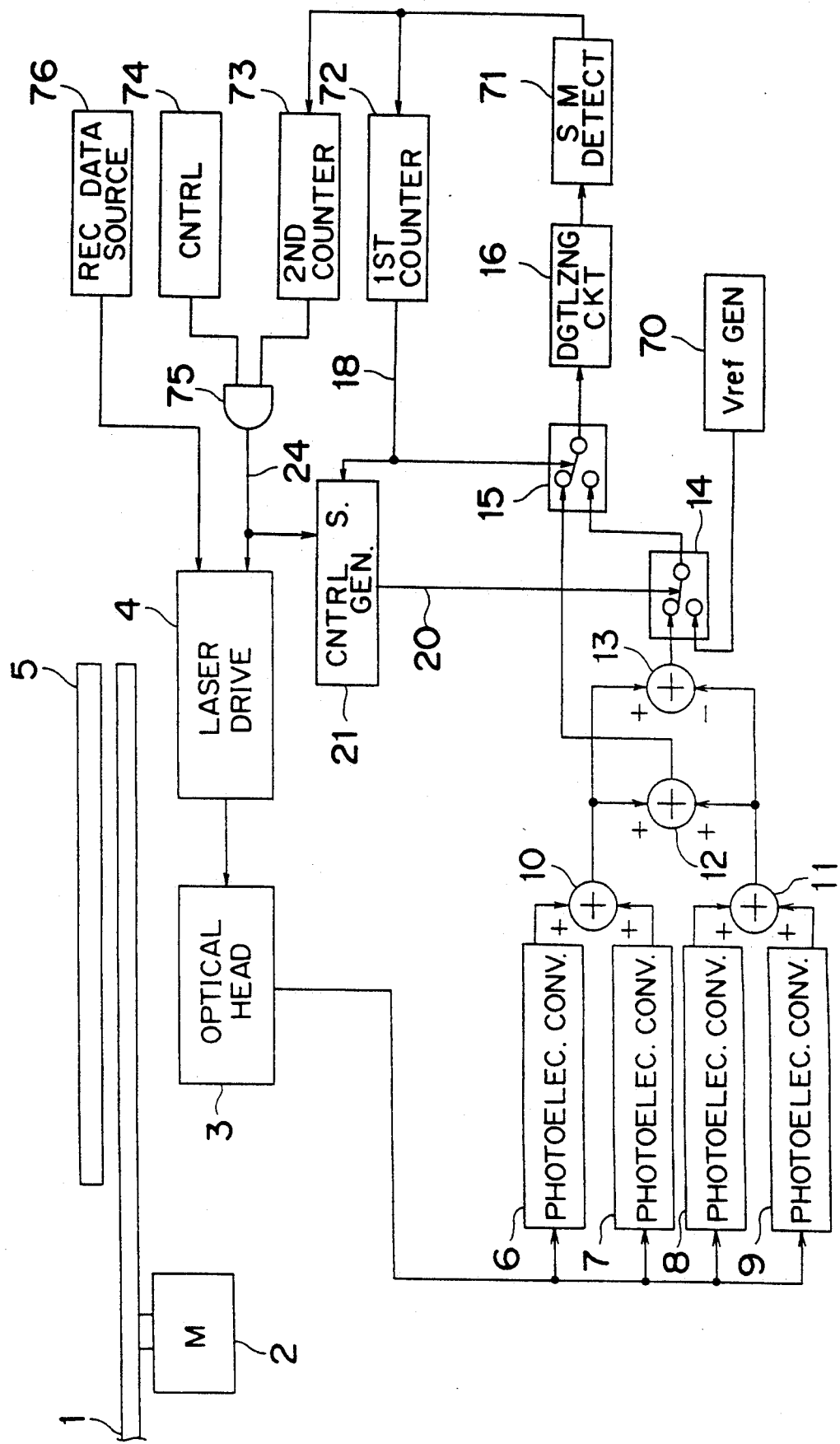
FIG. 3 shows a block diagram of an optical magnetic disk recording/reproducing apparatus according to the first embodiment of the present invention.

The first embodiment of the present invention is described below with reference to the accompanying FIGS. 3-10, of which FIG. 3 is a block diagram of a optical magnetic disk recording/reproducing apparatus.

An optical magnetic disk recording/reproducing apparatus according to the present invention as shown in FIG. 3 has a magneto-optical disk 1 driven by a spindle motor 2, and an optical head 3 to record, erase, and reproduce data to/from the disk 1. The optical head 3 comprises a laser, lens, actuator, and polarized beam splitter. The laser power of the optical head 3 is controlled by a laser drive circuit 4 which receives a control signal 24 from AND gate 75 and a recording data from a recording data source 76. A magnetic bias 5 is used to modify the magnetic properties of the magneto-optical disk 1. The optical signal from the optical head 3 is applied to photoelectric voltage conversion circuits 6-9. The signals from photoelectric voltage conversion circuits 6-9 are applied to adding amplifier circuits 10 and 11, the outputs of which are applied to adding amplifier circuit 12 and differential amplifier circuit 13.

A first selector switch circuit 14 controlled by a control signal 20 has two inputs, which are connected to the differential amplifier circuit 13 and a reference voltage generator 70, and one output. The first selector switch circuit 14 operates to output the differential amplifier circuit 13 signal when the control signal 20 is LOW (0), and to output the reference voltage Vref when the control signal 20 is HIGH (1). By the first selector switch circuit 14, the signal fluctuations of the data area during both data recording and erasing can be eliminated.

A second selector switch circuit 15 controlled by control signal 18 has two inputs, which are connected to the adding amplifier 12 and the first selector switch circuit 14, and one output connected to a digitalizing circuit 16. When the control signal 18 is HIGH (1), the selector switch circuit 15 outputs the adding amplifier 12 output signal, and when LOW (0) outputs the selector switch circuit 14 output signal.

A control signal generating circuit 21 is provided for generating the control signal 20 which is applied to the first selector switch circuit 14.

Figure 10:
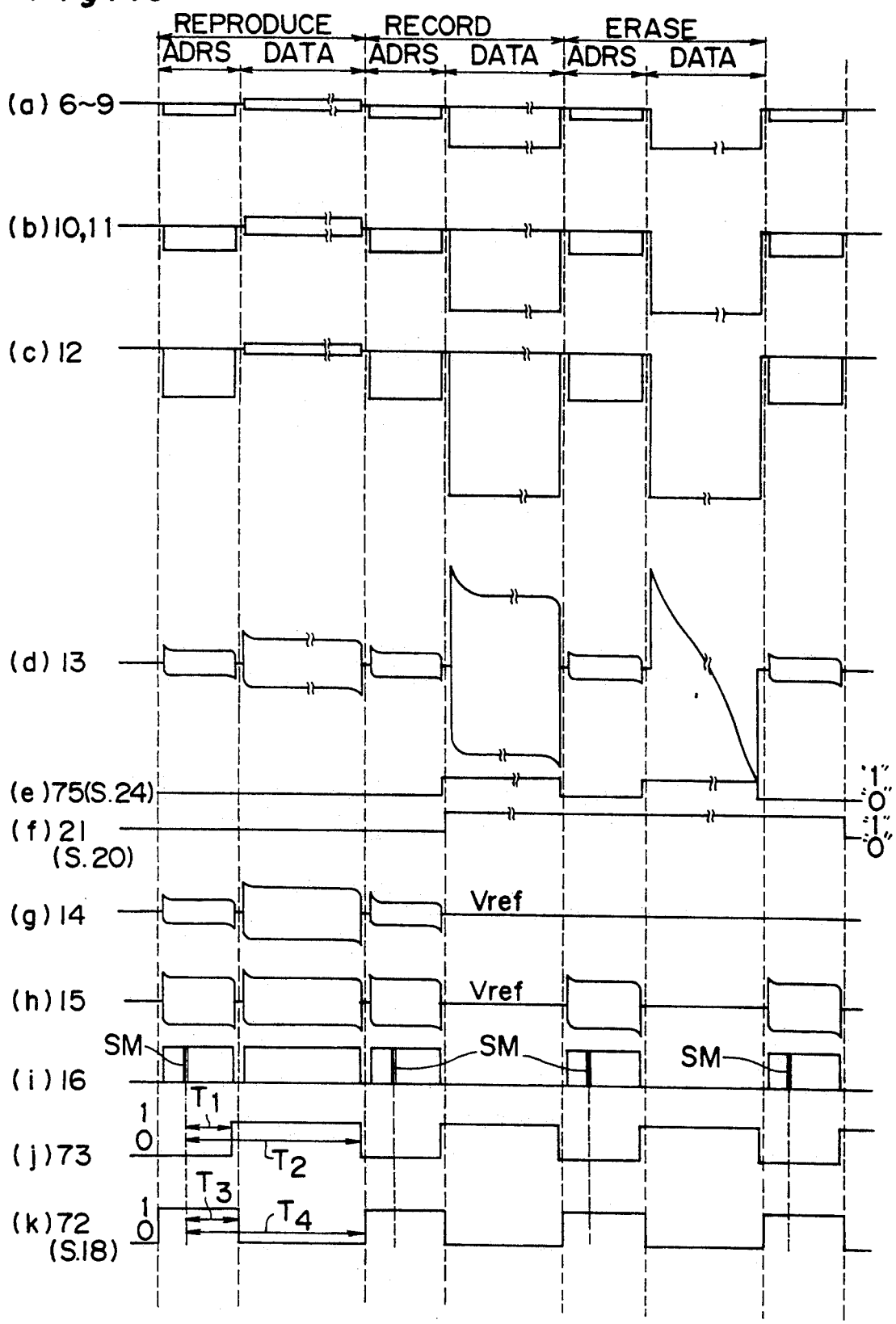
FIG. 10 shows waveforms from the circuit of the first embodiment of the invention.

The output of the digitalizing circuit 16 is connected to a sector mark detector 71 for detecting a sector mark SM provided in each address data, as shown in FIG. 10, waveform (i). A first counter 72 receives the sector mark SM and counts T3 and T4, as shown in FIG. 10, waveform (k) to produce the control signal 18, which is HIGH during the address period and LOW during the data period. A second counter 73 receives the sector mark SM and counts T1 and T2, as shown in FIG. 10, waveform (j) to produce a signal which is used for making the control signal 24. The signal produced from the second counter 73 becomes HIGH a short time before the start of the data period and becomes LOW a short time before the start of the address period.

A control 74 is provided for producing various command signals for reproducing, recording or erasing. When a record command signal or an erase command signal is produced, a HIGH level signal is applied to AND gate 75, and when a reproduce command signal is produced, a LOW level signal is applied to AND gate 75. Thus, AND gate 75 produces the control signal 24 which is LOW during the reproducing mode, but produces the signal from counter 73 during the recording mode or the erasing mode, as shown in FIG. 10, waveform (e).

A recording data source circuit 76 provides recording data to the laser drive circuit 4.

Figure 4:
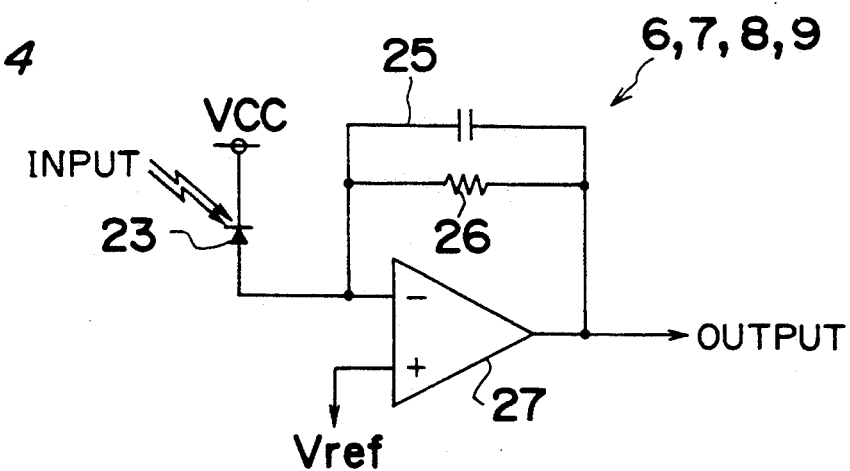
FIG. 4 shows a circuit diagram of the photoelectric voltage conversion circuits shown in FIG. 3.

Referring to FIG. 4, a detailed circuit diagram of one of the photoelectric voltage conversion circuits 6-9 is shown. The circuit comprises pin photo diode 23, capacitor 25, resistor 26, and differential amplifier 27. The light reflected from the laser spot formed on the magneto-optical disk 1 and picked up by the optical head 3 is photoelectrically converted by the pin photo diode 23, and current-voltage converted by the resistor 26. The capacitor 25 is used for band width limiting. The differential amplifier 27 takes the operating point at a reference voltage Vref. The output from the photoelectric voltage conversion circuits 6-9 is shown in FIG. 10 waveform (a).

Figure 5:
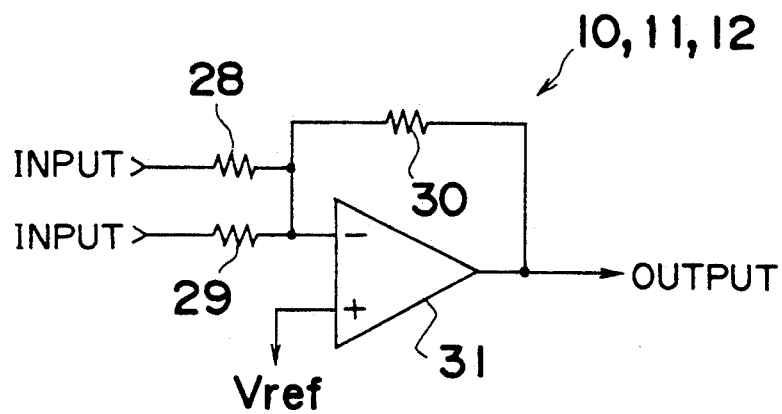
FIG. 5 shows a circuit diagram of the adding amplifiers shown in FIG. 3.

Referring to FIG. 5, a detailed circuit diagram of one of the adding amplifier circuits 10-12 is shown. The circuit comprises resistors 28-30, and a differential amplifier 31. The gain of the two inputs to each of the adding amplifiers 10 and 11 is determined by the resistance ratio of resistors 28, 29 and 30. The differential amplifier 31 takes the operating point at reference voltage Vref. The output from the adding amplifier circuits 10 and 11 is shown in FIG. 10 waveform (b) wherein the amplitude of both the address and data signals is doubled from the output signals from circuits 6–9. The output from the adding amplifier circuit 12 is shown in FIG. 10, waveform (c) wherein the amplitude of the address signal is doubled from the output signals from amplifiers 10 and 11.

Figure 6:
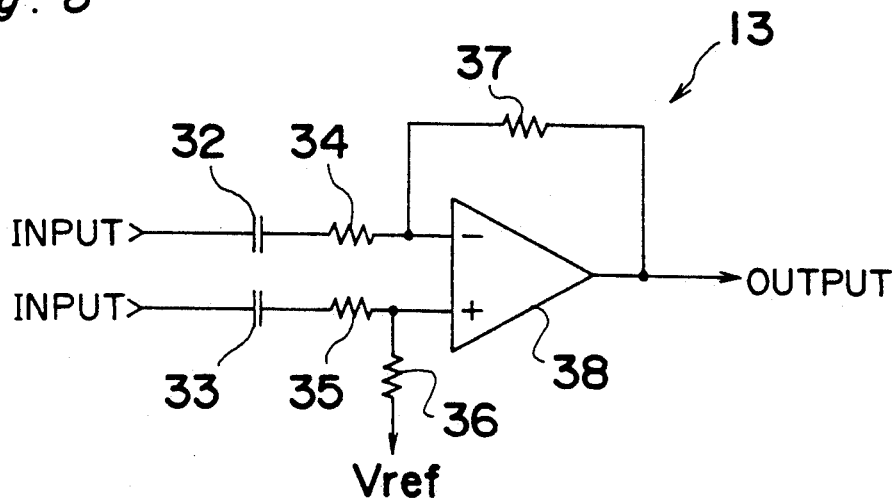
FIG. 6 shows a circuit diagram of the differential amplifier circuit shown in FIG. 3.

Referring to FIG. 6, the differential amplifier it 5 circuit 13 comprises capacitors 32 and 33, resistors 34 - 37, and a differential amplifier 38. The gain of the differential amplifier circuit 13 is determined by the resistance ratio of resistors 34 and 37, and resistors 35 and 36. The differential amplifier 38 takes the operating point at the reference voltage Vref. The output from the differential amplifier circuit 13 is shown in FIG. 10 waveform (d) wherein the data signal is amplified.

Figure 7:
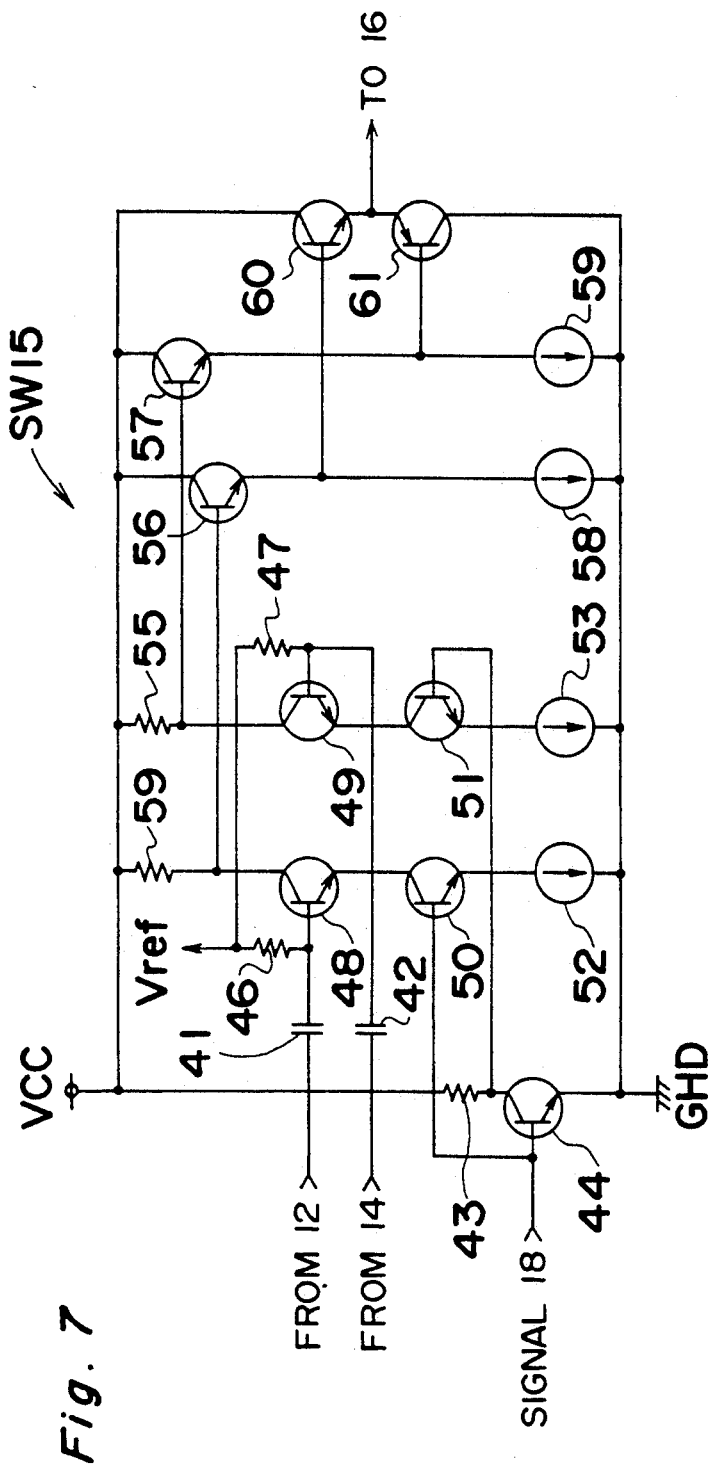
FIG. 7 shows a circuit diagram of the second selector switch circuit shown in FIG. 3.

Referring to FIG. 7, the second selector switch circuit 15 comprises capacitors 41 and 42, resistors 43, 46, 47, 54, and 55, NPN transistors 44, 48, 49, 50, 51, 56, 57, and 60, a PNP transistor 61, and current supplies 52, 53, 58, and 59. The output of the second selector switch circuit 15 is determined by the control signal 18. When the control signal 18 is HIGH (1), NPN transistor 50 turns ON, and a circuit formed by NPN transistors 48 and 50, power supply 52, and resistor 54 operates such that the signal from adding amplifier 12 is produced from the buffer amplifier formed by NPN transistors 56 and 60, PNP transistor 61, and power supply 58. When the control signal 18 is LOW (0), NPN transistor 51 turns ON, and a circuit formed by NPN transistors 49 and 51, power supply 53, and resistor 55 operates such that the signal from the differential amplifier circuit 13 is produced from the buffer amplifier formed by NPN transistors 57 and 60, PNP transistor 61, and power supply 59.

The first selector switch 14 can take the same circuit arrangement as the second selector switch 15 as shown in FIG. 7.

The output from the first and second selector switch circuits 14 and 15 are shown in FIG. 10 waveforms (g) and (h), respectively.

Figure 8:
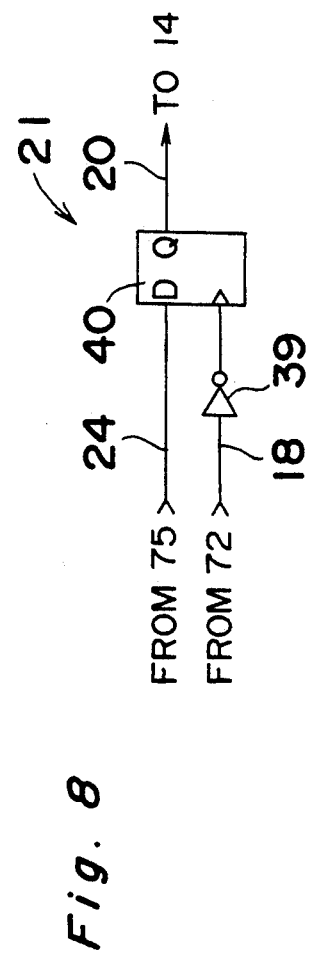
FIG. 8 shows a circuit diagram of the control signal generating circuit shown in FIG. 3.

Referring to FIG. 8 the control signal generating circuit 21 comprises a signal inverter 39 and a D flip-flop 40. The D terminal of D flip-flop 40 receives the control signal 24 (FIG. 10, waveform (e)), and the clock terminal thereof receives the inversed signal of the control signal 18, inversed by inverter 39. The output of the D flip-flop 40 produces the control signal 20, as shown in FIG. 10 waveform (f), which is LOW (0) during address area reproducing and data reproducing, and HIGH (1) in both the address and data signal periods during data recording and erasing.

Figure 9:
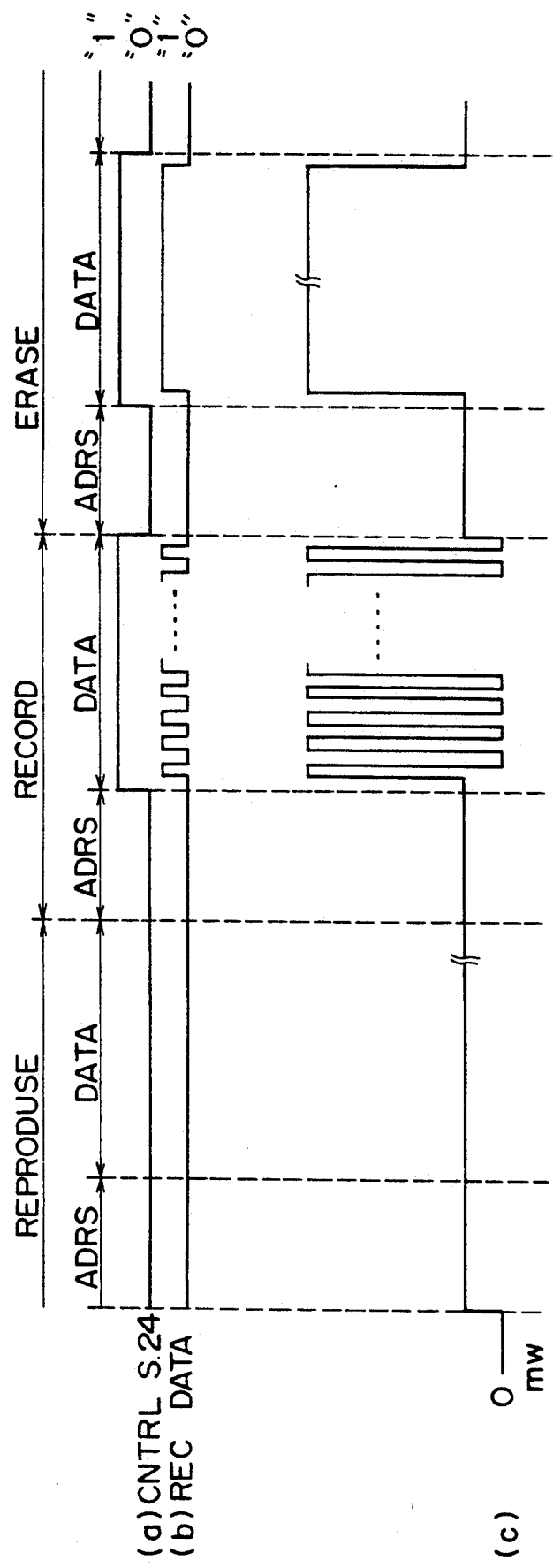
FIG. 9 shows waveforms used to describe the change in the laser power applied to the optical head shown in FIG. 3.

In operation, the magneto-optical disk 1 is driven rotationally by the spindle motor 2. When data is reproduced from the disk, the laser of the optical head 3 emits a DC pulse as shown in FIG. 9, forming a light spot on the magneto-optical disk 1. The reflection from this spot is picked up by the optical head 3 and output to the photoelectric voltage conversion circuits 6–9.

As shown by FIG. 9 waveform (a), recording and erasing occurs during the HIGH (1) state of the control signal 24. During data recording, the magnetic bias 5 field is oriented to the N pole. From recording data source 76, recording data in a train of pulses as shown in FIG. 9 waveform (b) is applied to the laser drive circuit 4 which then drives the optical head 3 to produce high and low power emission pulses during recording, as shown in FIG. 9 waveform (c). The magnetic field of the magnetic bias 5 is recorded to form the data pits at the high power laser pulses.

When erasing data, the magnetic bias 5 field is oriented to the S pole. Data is erased by recording a data pit value of 1, and the optical head 3 laser emissions are high laser power DC emissions as controlled by the laser drive circuit 4. These DC emissions erase the recorded data pits.

As noted in the international standard ISO/IEC No. 10090, magneto-optical disk 1 recordings contain an address area identifying the track, sector, and other addressing information, and the data area containing user data. The address area is recorded with a series of pits and lands, so that the phases of the electric signals corresponding to the address area as produced from the photoelectric voltage conversion circuits 6–9 are the same. The output signal from the data area, however, is affected by the Kerr effect accompanying changes in the magnetic field orientation of the medium. As a result, the phases of the electric signals corresponding to the data area as produced from the photoelectric voltage conversion circuits 6 and 7 are the same phase, and those from the circuits 8 and 9 are the same phase, but the phases of the electric signals corresponding to the data area from circuits 6 and 7 are opposite to those from circuits 8 and 9.

It is therefore necessary to use adding amplifiers 10, 11, and 12 to add the outputs of photoelectric voltage conversion circuits 6–9 when reproducing the address area. When reproducing the data area, the outputs of photoelectric voltage conversion circuit pairs 6–7 and 8–9 are respectively added by adding amplifiers 10 and 11, and the difference between the adding amplifier outputs 10 and 11 is obtained and output by the differential amplifier circuit 13.

During the reproducing mode of operation, switch 14 is maintained in the position shown in FIG. 3, since the signal 20 from the control signal generator 21 is maintained LOW, and switch 15 is alternately turned to the position shown in FIG. 3 when the signal 18 is HIGH, and to the opposite position when the signal 18 is LOW. Therefore, during the reproducing mode, the address signal from the adding amplifier 12 and the data signal from switch 14 are sent alternately to the digitalizing circuit 16.

During the recording mode or the erasing mode, switch 14 is maintained in the Position opposite to that shown in FIG. 3, since the signal 20 from the control signal generator is maintained HIGH, and switch 15 is alternately turned to the position shown in FIG. 3 when the signal 18 is HIGH, and to the opposite position when the signal 18 is LOW. Therefore, during the recording mode or the erasing mode, the address signal from the adding amplifier 12 and the reference signal Vref from switch 14 are sent alternately to the digitalizing circuit 16.

By the use of selector switch circuits 14 and 15, the data signal will not be supplied to the digitalizing circuit 16 during data recording and erasing modes. Thus, it is not necessary to provide an automatic gain control circuit. Accordingly, the detection of the address area can be stabilized during data recording, erasing, and reproducing modes.

SECOND EMBODIMENT

A second embodiment of the invention is described below with reference to FIG. 11.

When compared with the first embodiment, the second embodiment further has a constant gain amplifier 80 for amplifying the output of the first adding amplifier 10 by a constant gain rate, and a third selector switch circuit 81 controlled by a control signal from a disk type detector 82. The constant gain amplifier 80 amplifies the address signal and data signal from the first adding amplifier 10 with a constant gain level. The third selector switch 81 can take the same circuit arrangement as the second selector switch 15 as shown in FIG. 7.

The operation of this second embodiment so comprised is described below.

The magneto-optical disks have various types which are: multiple write/erase type disks; read-only-medium disks (ROM) in which both the address and data signals are recorded with physical pits and lands; write-once-read-many (W/O) disks that can be written to only once by the end user but can then be read multiple times; and phase-change (PC) disks in which the phase of the data area is changed. In general, the data is reproduced from these disks by detecting the change in the reflectivity of the data area, and cannot be read by a conventional optical magnetic disk recording/reproducing apparatus because of the high reflectivity and output of the data area from the adding amplifier. Optical magnetic disks and ROM disks can be detected from the FA1 and FA2 sensor holes provided in the disk cartridge in accordance with ISO/IEC international standard No. 10090. The present invention utilizes this identification characteristic to set the third selector switch circuit 17 control signal 22 HIGH (1) when an optical magnetic disk is detected, and LOW (0) when a ROM disk is detected.

Figure 11:
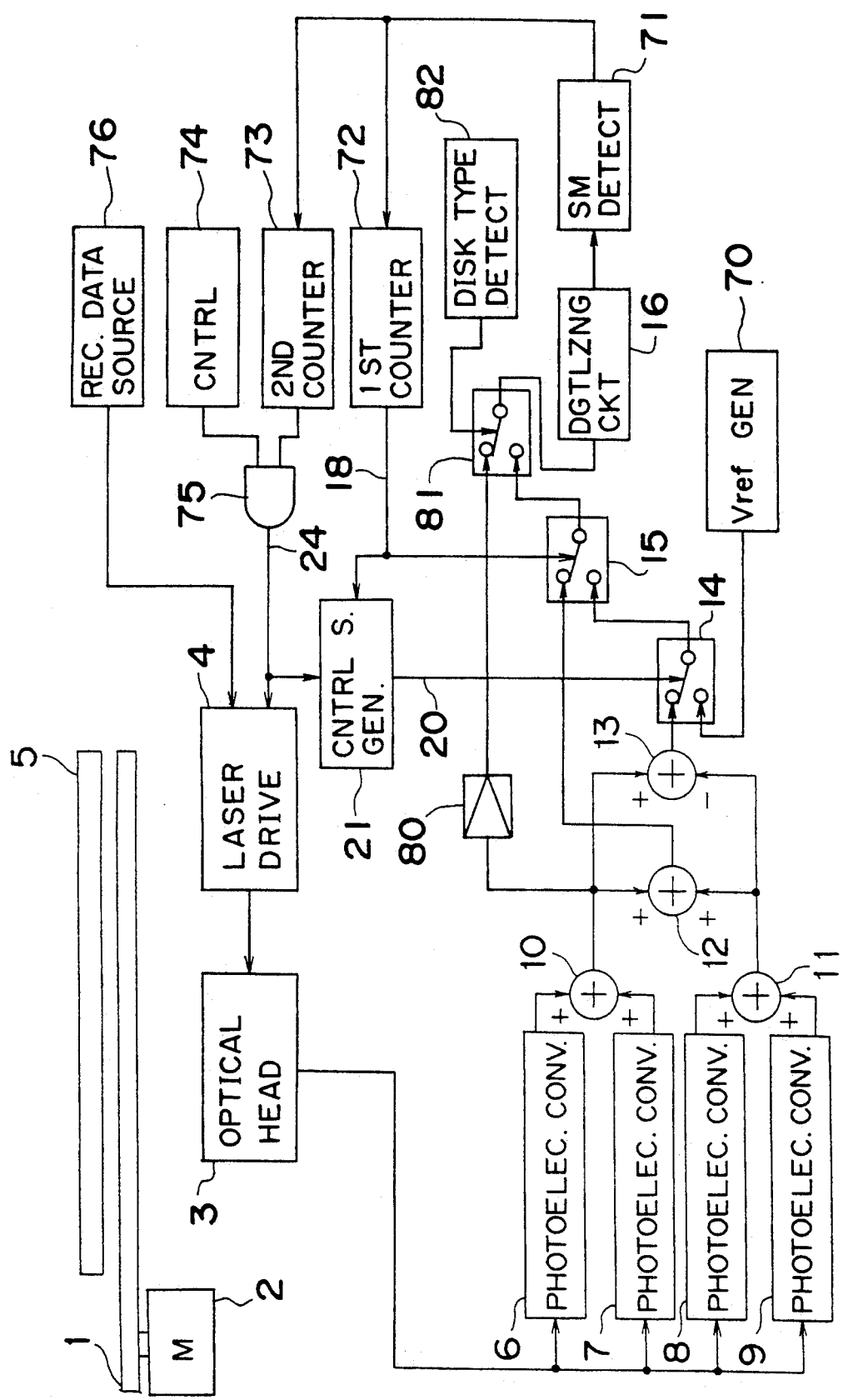
FIG. 11 show a block diagram of an optical magnetic disk recording/reproducing apparatus according to the second embodiment of the present invention.

When the optical magnetic disk is loaded, switch 81 is turned to the position opposite to that shown in FIG. 11, so that the operation is the same as that described above in the first embodiment.

When ROM disk, W/O disk, or PC disk is loaded, switch 81 is turned to the position shown in FIG. 11 by the LOW level signal from the disk type detector 82. At this time, the output from the constant gain amplifier 80 is applied to the digitalizing circuit 16, enabling the data reproduction from these types of disks.

It is therefore possible according to the second embodiment of the invention to reproduce signals from disks with different reflectivity characteristics or that use different reproduction methods by providing a constant gain amplifier 80 for setting the output of the adding means to a suitable gain level, and a third switching means 81 for selecting between the output of the constant gain amplifier 81 and the output of the second selector switch circuit 15, which selects the address area or the data area.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A disk recording/reproducing apparatus for recording/reproducing address signal and data signal alternately on a disk comprising:
   a head means for emitting a beam to a disk and for receiving a reflected beam from the disk;
   first, second, third and fourth photoelectric voltage conversion means for converting reflected beam to electric signal;
   a first adding means for adding the outputs from the first and second photoelectric voltage conversion means;
   a second adding means for adding the outputs from the third and fourth photoelectric voltage conversion means;
   a third adding means for adding the outputs of the first and second adding means;
   a differential operating means for outputting a difference between the first and second adding means;
   a first switching means for switching between a first position in which an output of the first switching means is connected to the output of the differential operating means and a second position in which the output of the first switching means is connected to a reference voltage;
   a second switching means for switching between a first position in which an output of the second switching means is connected to the output of the third adding means and a second position in which an output of the second switching means is connected to the output of the first switching means;
   a first control signal generating means for generating a first control signal which takes a first level during an address signal period and a second level during a data signal period, said first control signal being used for turning said second switching means to the first and second positions in response to said first and second levels thereof respectively; and
   a second control signal generating means for generating a second control signal which takes a first level during a recording or erasing mode of operation and a second level during a reproducing mode of operation, said second control signal used for turning said first switching means to the first and second positions in response to said second and first levels thereof, respectively.

2. A disk recording/reproducing apparatus as claimed in claim 1, further comprising:
   a constant gain amplifier for amplifying the output of the first adding means;
   a third switching means for switching between a first position in which an output of the third switching means is connected to the constant gain amplifier and a second position in which the output of the third switching means is connected to the output of the second switching means; and
   a disk type detector for detecting the type of disk mounted and for producing a first type signal when the mounted disk is any one of ROM disk, W/O (write once) disk and PC (phase change) disk and a second type signal when the mounted disk is an optical magnetic disk, said third switching means being switched to said first position in response to the receipt of first type signal and to said second position in response to the receipt of the second type signal.

* * * * *

UNITED STATES PATENT AND TRADEMARK OFFICE
CERTIFICATE OF CORRECTION

PATENT NO. : 5,276,665
DATED : January 4, 1994
INVENTOR(S) : Aoki et al

It is certified that error appears in the above-indentified patent and that said Letters Patent is hereby corrected as shown below:

On the title page, Item [30]: delete "July. 27, 1991" and insert --Jul. 24, 1991--.

Column 8, line 1, delete "/" and insert --and--.
          line 2, delete "/" and insert --and--.
          line 46, delete "/" and insert --and--.

Signed and Sealed this

Twenty-first Day of June, 1994

Attest:

BRUCE LEHMAN

Attesting Officer     Commissioner of Patents and Trademarks